(12) United States Patent
Yeh

(10) Patent No.: US 9,958,651 B2
(45) Date of Patent: May 1, 2018

(54) PANORAMIC LENS ASSEMBLY

(71) Applicants: Sintai Optical (Shenzhen) Co., Ltd., ShenZhen, Guandong Province (CN); Asia Optical Co., Inc., Taichung (TW)

(72) Inventor: Ching-Chung Yeh, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days. days.

(21) Appl. No.: 15/469,699

(22) Filed: Mar. 27, 2017

(65) Prior Publication Data

US 2017/0322398 A1    Nov. 9, 2017

(30) Foreign Application Priority Data

May 6, 2016   (CN) .......................... 2016 1 0298869

(51) Int. Cl.
| G02B 13/06 | (2006.01) |
| G02B 5/04 | (2006.01) |
| G02B 13/00 | (2006.01) |

(52) U.S. Cl.
CPC ............... *G02B 13/06* (2013.01); *G02B 5/04* (2013.01); *G02B 13/0065* (2013.01)

(58) Field of Classification Search
CPC ....... G02B 13/06; G02B 13/0065; G02B 5/04
USPC ........................................................ 359/725
See application file for complete search history.

(56) References Cited

U.S. PATENT DOCUMENTS

| 8,717,413 | B2* | 5/2014 | Wilson | G02B 13/06 348/36 |
| 2002/0136150 | A1* | 9/2002 | Mihara | G02B 15/173 369/125 |
| 2007/0052833 | A1* | 3/2007 | Matsui | G02B 13/08 348/335 |
| 2010/0073459 | A1* | 3/2010 | Wilson | G02B 13/06 348/36 |
| 2011/0001789 | A1* | 1/2011 | Wilson | G02B 13/06 348/36 |
| 2013/0050405 | A1* | 2/2013 | Masuda | G02B 13/06 348/36 |
| 2013/0242040 | A1* | 9/2013 | Masuda | H04N 5/2251 348/36 |

(Continued)

*Primary Examiner* — William R Alexander
(74) *Attorney, Agent, or Firm* — McClure, Qualey & Rodack, LLP

(57) ABSTRACT

A panoramic lens assembly includes a first lens assembly which includes a first lens group, a first prism and a second lens group, all of which are arranged in order from a first object side to a first image side along a first optical axis. The first lens group is with negative refractive power and includes a first and a second lens. The first prism includes a first incident surface, a first reflective surface and a first exit surface. The second lens group is with positive refractive power and includes a third, a fourth, a fifth, a sixth and a seventh lens. The first lens assembly satisfies: $0.2 \leq TTL_1/\theta_{1m} \leq 0.4$, wherein $TTL_1$ is an interval in mm from an object surface of the first lens to a first image plane along the first optical axis and $\theta_{1m}$ is a half maximum field of view in degree for the first lens assembly.

20 Claims, 12 Drawing Sheets

(56) References Cited

U.S. PATENT DOCUMENTS

| | | | |
|---|---|---|---|
| 2014/0132709 A1* | 5/2014 | Satoh | G02B 19/008 |
| | | | 348/36 |
| 2015/0015664 A1* | 1/2015 | Masuda | G02B 13/06 |
| | | | 348/36 |
| 2015/0237241 A1* | 8/2015 | Wilson | H04N 5/2254 |
| | | | 348/36 |
| 2016/0353020 A1* | 12/2016 | Satoh | H04N 5/23238 |
| 2017/0310895 A1* | 10/2017 | Masuda | H04N 5/23238 |

* cited by examiner

PANORAMIC LENS ASSEMBLY

BACKGROUND OF THE INVENTION

Field of the Invention

The invention relates to a panoramic lens assembly.

Description of the Related Art

A conventional lens assembly is not easy to shoot a panoramic image. Users usually need to manually sweep the scene through 360 degrees and take a few photos in order to constitute a panoramic image. Users cannot stand in a fixed position to shoot a panoramic image as general shooting. Therefore, a panoramic lens assembly with new structure is needed, allowing users to simply stand in a fixed position and shoot once to take a panoramic image.

BRIEF SUMMARY OF THE INVENTION

The invention provides a panoramic lens assembly to solve the above problems. The panoramic lens assembly of the invention is provided with characteristic of a thinner thickness and still has a good optical performance. Users simply stand in the fixed position to shoot once and capture panoramic image easily.

The panoramic lens assembly in accordance with an exemplary embodiment of the invention includes a first lens assembly. The first lens assembly includes a first lens group, a first prism and a second lens group, all of which are arranged in order from a first object side to a first image side along a first optical axis. The first lens group is with negative refractive power and includes a first lens with negative refractive power and a second lens with negative refractive power, all of which are arranged in order from the first object side to the first image side along the first optical axis. The first prism includes a first incident surface, a first reflective surface and a first exit surface, wherein the first incident surface faces an image side surface of the second lens. The second lens group is with positive refractive power and includes a third lens, a fourth lens, a fifth lens, a sixth lens and a seventh lens, all of which are arranged in order from the first object side to the first image side along the first optical axis, wherein an object side surface of the third lens faces the first exit surface of the first prism and a refractive power of the third lens is opposite to a refractive power of the fifth lens. The first lens assembly satisfies: $0.2 \leq TTL_1/\theta_{1m} \leq 0.4$, wherein $TTL_1$ is an interval in mm from an object surface of the first lens to a first image plane along the first optical axis and $\theta_{1m}$ is a half maximum field of view in degree for the first lens assembly.

The panoramic lens assembly in accordance with another exemplary embodiment of the invention includes a first lens assembly. The first lens assembly includes a first lens group, a first prism and a second lens group, all of which are arranged in order from a first object side to a first image side along a first optical axis. The first lens group is with negative refractive power and includes a first lens with negative refractive power and a second lens with negative refractive power, all of which are arranged in order from the first object side to the first image side along the first optical axis. The first prism includes a first incident surface, a first reflective surface and a first exit surface, wherein the first incident surface faces an image side surface of the second lens. The second lens group is with positive refractive power and includes a third lens, a fourth lens, a fifth lens, a sixth lens and a seventh lens, all of which are arranged in order from the first object side to the first image side along the first optical axis, wherein an object side surface of the third lens faces the first exit surface of the first prism and a refractive power of the third lens is opposite to a refractive power of the fifth lens. The third lens and the fifth lens satisfy: $37 \leq Vd_3 - Vd_5 \leq 50$, wherein $Vd_3$ is an Abbe number of the third lens and $Vd_5$ is an Abbe number of the fifth lens.

The seventh lens is an aspheric lens and a sign of the refractive power of the third, fourth, fifth, sixth and seventh lens is positive, positive, negative, positive and positive.

The first lens assembly satisfies: $-4 \leq f_1/R_{12} \leq -0.667$, wherein $f_1$ is an effective focal length of the first lens and $R_{12}$ is a radius of curvature of an image side surface of the first lens.

The first lens assembly satisfies: $4 \leq ER_{11}/f_f \leq 8$, wherein $ER_{11}$ is an effective radius of an object side surface of the first lens and $f_f$ is an effective focal length of the first lens assembly.

The first lens assembly further comprises a stop disposed between the third lens and the fourth lens.

The panoramic lens assembly further includes a second lens assembly, wherein the second lens assembly includes a third lens group, a second prism and a fourth lens group, all of which are arranged in order from a second object side to a second image side along a second optical axis, wherein the third lens group is with negative refractive power and includes an eighth lens with negative refractive power and a ninth lens with negative refractive power, all of which are arranged in order from the second object side to the second image side along the second optical axis, the second prism includes a second incident surface, a second reflective surface and a second exit surface, wherein the second incident surface faces an image side surface of the ninth lens, the fourth lens group is with positive refractive power and includes a tenth lens, an eleventh lens, a twelfth lens, a thirteenth lens and a fourteenth lens, all of which are arranged in order from the second object side to the second image side along the second optical axis, wherein an object side surface of the tenth lens faces the second exit surface of the second prism and a refractive power of the tenth lens is opposite to a refractive power of the twelfth lens, and the first object side and the second object side are opposite to each other, the first image side and the second image side are opposite to each other.

The second lens assembly satisfies: $0.2 \leq TTL_2/\theta_{2m} \leq 0.4$, $37 \leq Vd_{10} - Vd_{12} \leq 50$, wherein $TTL_2$ is an interval in mm from an object surface of the eighth lens to a second image plane along the second optical axis, $\theta_{2m}$ is a half maximum field of view in degree for the second lens assembly, $Vd_{10}$ is an Abbe number of the tenth lens and $Vd_{12}$ is an Abbe number of the twelfth lens.

The second lens assembly satisfies: $-4 \leq f_8/R_{82} \leq -0.667$, $4 \leq ER_{81}/f_s \leq 8$, wherein $f_8$ is an effective focal length of the eighth lens and $R_{82}$ is a radius of curvature of an image side surface of the eighth lens, $ER_{81}$ is an effective radius of an object side surface of the eighth lens and $f_s$ is an effective focal length of the second lens assembly.

The fourteenth lens is an aspheric lens and a sign of the refractive power of the tenth, eleventh, twelfth, thirteenth and fourteenth lens is positive, positive, negative, positive and positive.

The second lens assembly further includes a stop disposed between the tenth lens and the eleventh lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
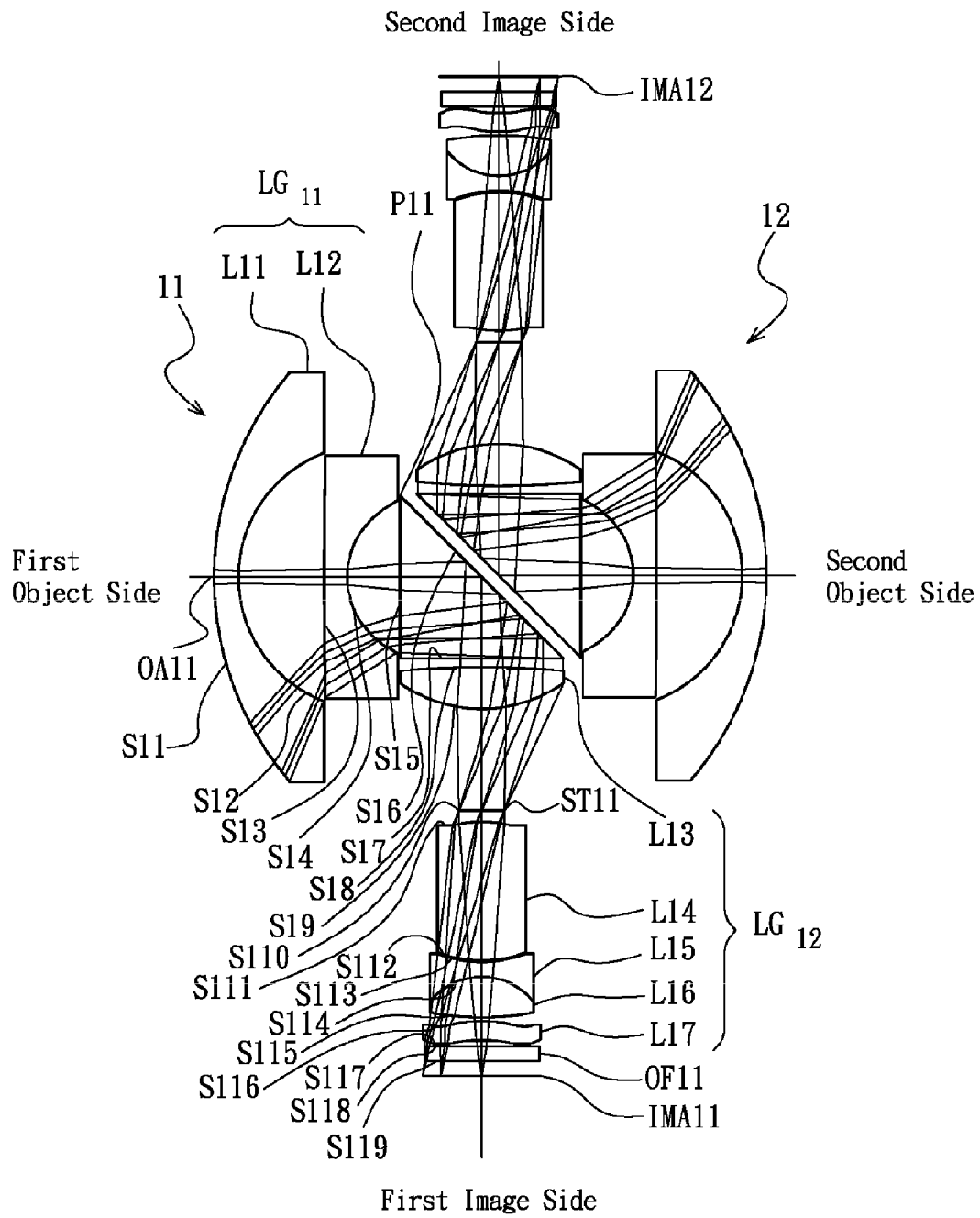
FIG. 1 is a lens layout and optical path diagram of a panoramic lens assembly in accordance with a first embodiment of the invention.

Referring to FIG. 1, FIG. 1 is a lens layout and optical path diagram of a panoramic lens assembly in accordance with a first embodiment of the invention. The panoramic lens assembly 1 includes a first lens assembly 11 and a second lens assembly 12. The first lens assembly 11 is used for capturing an image of a first object side. In operation, an image of light rays from the first object side is formed at a first image plane IMA11. The second lens assembly 12 is used for capturing an image of a second object side. In operation, an image of light rays from the second object side is formed at a second image plane IMA12. The first object side and the second object side are opposite to each other, the first image side and the second image side are opposite to each other. When the field of view of the first lens assembly 11 and the second lens assembly 12 is 180 degrees or more, the image on the first image plane IMA11 and the image on the second image plane IMA12 can be processed to form a panoramic image with field of view of 360 degrees. Therefore, when the first object side and the second object side are fixed, the panoramic lens assembly 1 only needs to shoot once so as to obtain the panoramic image. In the first embodiment, the first lens assembly 11 and the second lens assembly 12 are substantially the same lens assembly. Therefore, the relative parameters of the respective lenses, the aspheric coefficients of the respective lenses, satisfied conditions and the optical properties of the first lens assembly 11 and the second lens assembly 12 are the same. Therefore, only the relative parameters of the respective lenses, the aspheric coefficients of the respective lenses, satisfied conditions and the optical properties of the first lens assembly 11 are described below. The second lens assembly 12 is not described. The first lens assembly 11 includes a first lens group $LG_{11}$, a first prism P11, a second lens group $LG_{12}$ and an optical filter OF11, all of which are arranged in order from a first object side to a first image side along a first optical axis OA11. The first lens group $LG_{11}$ includes a first lens L11 and a second lens L12, all of which are arranged in order from the first object side to the first image side along the first optical axis OA11. The first lens group $LG_{11}$ is with negative refractive power. The first lens L11 is a meniscus lens with negative refractive power, wherein the object side surface S11 is a convex surface, the image side surface S12 is a concave surface and both of the object side surface S11 and image side surface S12 are spherical surfaces. The second lens L12 is a meniscus lens with negative refractive power, wherein the object side surface S13 is a convex surface, the image side surface S14 is a concave surface and both of the object side surface S13 and image side surface S14 are aspheric surfaces. The first prism P11 includes a first incident surface S15, a first reflective surface S16 and a first exit surface S17, all of which are plane surfaces. The light rays from the second lens L12 enter the first prism P11 from the first incident surface S15 and then are reflected by the first reflective surface S16 to change the transmission direction and exit the first prism P11 from the first exit surface S17. The primary function of the first prism P11 is to change the transmission direction of the incident light rays so as to shorten the thickness of the first lens assembly 11. The second lens group $LG_{12}$ includes a third lens L13, a stop ST11, a fourth lens L14, a fifth lens L15, a sixth lens L16 and a seventh lens L17, all of which are arranged in order from the first object side to the first image side along the first optical axis OA11. The second lens group $LG_{12}$ is with positive refractive power. The third lens L13 is a biconvex lens with positive refractive power, wherein the object side surface S18 is a convex surface, the image side surface S19 is a convex surface and both of the object side surface S18 and image side surface S19 are spherical surfaces. The fourth lens L14 is a biconvex lens with positive refractive power, wherein the object side surface S111 is a convex surface, the image side surface S112 is a convex surface and both of the object side surface S111 and image side surface S112 are spherical surfaces. The fifth lens L15 is a biconcave lens with negative refractive power, wherein the object side surface S113 is a concave surface, the image side surface S114 is a concave surface and both of the object side surface S113 and image side surface S114 are spherical surfaces. The sixth lens L16 is a biconvex lens with positive refractive power, wherein the object side surface S114 is a convex surface, the image side surface S115 is a convex surface and both of the object side surface S114 and image side surface S115 are spherical surfaces. The fifth lens L15 and the sixth lens L16 are cemented together to form a cemented lens. The seventh lens L17 is a meniscus lens with positive refractive power, wherein the object side surface S116 is a convex surface, the image side surface S117 is a concave surface and both of the object side surface S116 and image side surface S117 are aspheric surfaces. Both of the object side surface S118 and image side surface S119 of the optical filter OF11 are plane surfaces.

In order to maintain excellent optical performance of the panoramic lens assembly in accordance with the first embodiment of the invention, the panoramic lens assembly 1 satisfies at least one of the following conditions:

$$0.2 \leq TTL1_1/\theta1_{1m} \leq 0.4 \quad (1)$$

$$-4 \leq f1_1/R1_{12} \leq -0.067 \quad (2)$$

$$4 \leq ER1_{11}/f1_f \leq 8 \quad (3)$$

$$37 \leq Vd1_3 - Vd1_5 \leq 50 \quad (4)$$

wherein $TTL1_1$ is an interval in mm from the object surface S11 of the first lens L11 to the first image plane IMA11 along the first optical axis OA11, $\theta1_{1m}$ is a half maximum field of view in degree for the first lens assembly 11, $f1_1$ is an effective focal length of the first lens L11, $R1_{12}$ is a radius of curvature of the image side surface S12 of the first lens L11, $ER1_{11}$ is an effective radius of the object side surface S11 of the first lens L11, $f1_f$ is an effective focal length of the first lens assembly 11, $Vd1_3$ is an Abbe number of the third lens L13 and $Vd1_5$ is an Abbe number of the fifth lens L15.

By the above design of the lenses, stop ST11 and the first prism P11, the first lens assembly 11 is provided with a shortened thickness and an effective corrected aberration.

In order to achieve the above purposes and effectively enhance the optical performance, the first lens assembly 11 in accordance with the first embodiment of the invention is provided with the optical specifications shown in Table 1, which include the effective focal length, F-number, radius of curvature of each lens surface, thickness between adjacent surface, refractive index of each lens and Abbe number of each lens. Table 1 shows that the effective focal length is equal to 1.409 mm and F-number is equal to 2.889 for the first lens assembly 11 of the first embodiment of the invention.

TABLE 1

Effective Focal Length = 1.409 mm
F-number = 2.889

| Surface Number | Radius of Curvature (mm) | Thickness (mm) | Nd | Vd | Remark |
|---|---|---|---|---|---|
| S11 | 12.399 | 0.952 | 1.8 | 46.6 | The First Lens L11 |
| S12 | 5.215 | 3.348 | | | |
| S13 | 72.864 | 0.9 | 1.74 | 49.3 | The Second Lens L12 |
| S14 | 3.089 | 2.092 | | | |
| S15 | ∞ | 3.21 | 1.85 | 23.8 | The First Prism P11 |
| S16 | ∞ | 3.21 | 1.85 | 23.8 | |
| S17 | ∞ | 0.315 | | | |
| S18 | 30.432 | 1.645 | 1.52 | 64.2 | The Third Lens L13 |
| S19 | -5.658 | 3.996 | | | |
| S110 | ∞ | 0.461 | | | Stop ST11 |
| S111 | 5.648 | 5.474 | 1.82 | 46.6 | The Fourth Lens L14 |
| S112 | -4.467 | 0.05 | | | |
| S113 | -4.467 | 0.549 | 1.85 | 23.8 | The Fifth Lens L15 |
| S114 | 2.492 | 1.614 | 1.8 | 46.6 | The Sixth Lens L16 |
| S115 | -10.908 | 0.163 | | | |
| S116 | 5.0243 | 0.736 | 1.85 | 23.8 | The Seventh Lens L17 |
| S117 | 6.078 | 0.236 | | | |
| S118 | ∞ | 0.400 | 1.52 | 54.5 | Optical Filter OF11 |
| S119 | ∞ | 3.601 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the first embodiment, the conic constant k and the aspheric coefficients A, B, C, D, E, F of each surface are shown in Table 2.

TABLE 2

| Surface Number | k | A | B | C | D | E | F |
|---|---|---|---|---|---|---|---|
| S13 | 0 | -3.609E-04 | 6.213E-06 | 0 | 0 | 0 | 0 |
| S14 | -0.1684 | 6.6112E-04 | -5.092E-05 | 0 | 0 | 0 | 0 |
| S116 | -24.8801 | 0.0144 | -5.779E-03 | 1.649E-04 | 9.9264E-05 | -2.793E-05 | -1.3404E-06 |
| S117 | 0 | -5.291E-03 | -1.831E-03 | -3.8210E-04 | 1.4493E-05 | 1.926E-05 | -2.2018E-06 |

For the first lens assembly 11 of the first embodiment, the interval $TTL1_1$ from the object side surface S11 of the first lens L1 to the first image plane IMA11 along the first optical axis OA11 is equal to 30.118 mm, the half maximum field of view $\theta1_{1m}$ for the first lens assembly 11 is equal to 95 degrees, the effective focal length $f1_1$ of the first lens L11 is equal to -11.841 mm, the radius of curvature $R1_{12}$ of the image side surface S12 of the first lens L11 is equal to 5.215 mm, the effective radius $ER1_{11}$ of the object side surface S11 of the first lens L11 is equal to 8.055 mm, the effective focal length $f1_f$ of the first lens assembly 11 is equal to 1.409 mm, the Abbe number $Vd1_3$ of the third lens L13 is equal to 64.2 and the Abbe number $Vd1_5$ of the fifth lens L15 is equal to 23.8. According to the above data, the following values can be obtained:

$TTL1_1/\theta1_{1m}=0.32$, $f1_1/R1_{12}=-2.271$, $ER1_{11}/f1_f=5.7$, $Vd1_3-Vd1_5=40.4$ which respectively satisfy the above conditions (1)-(4).

Figure 2A:
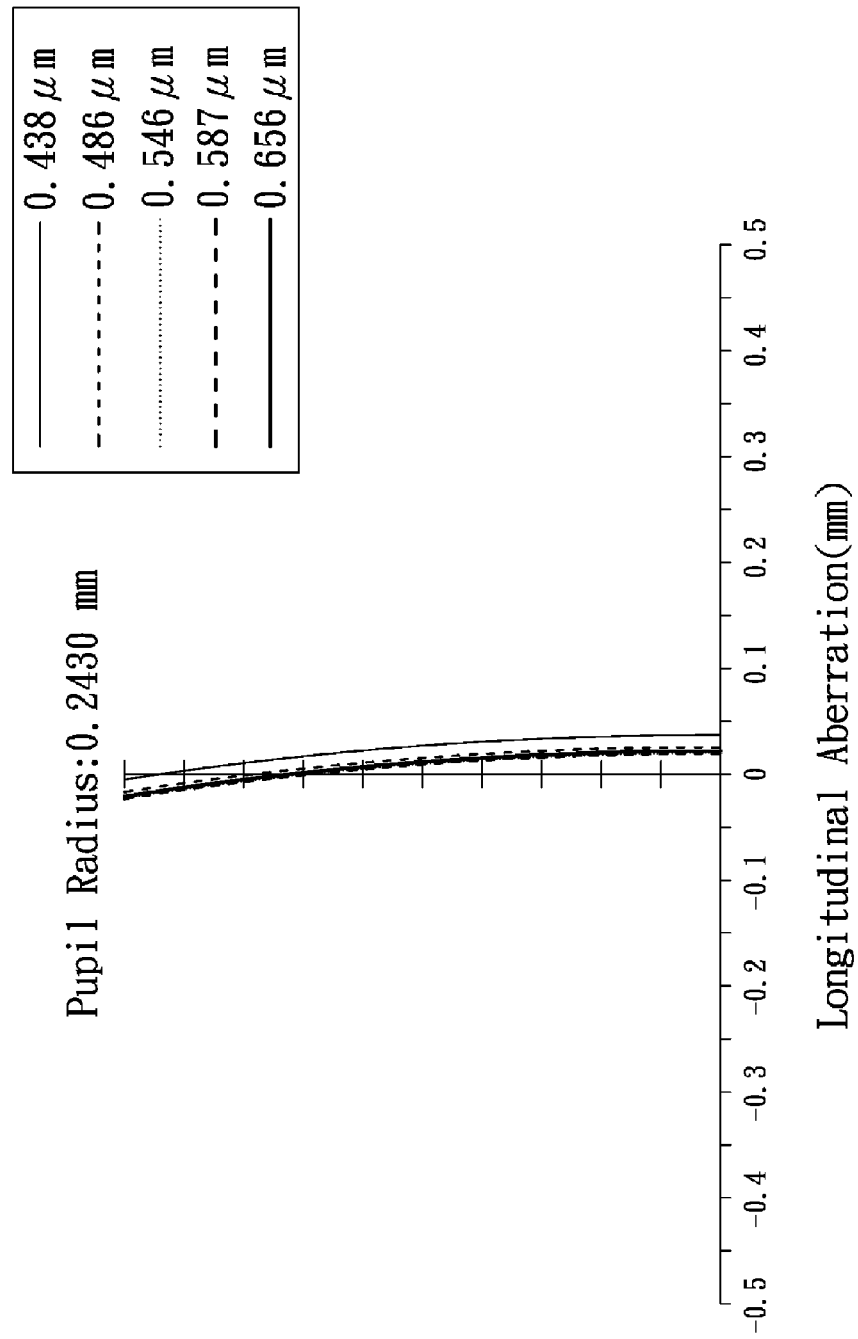
FIG. 2A depicts a longitudinal aberration diagram of the panoramic lens assembly in accordance with the first embodiment of the invention.
Figure 2B:
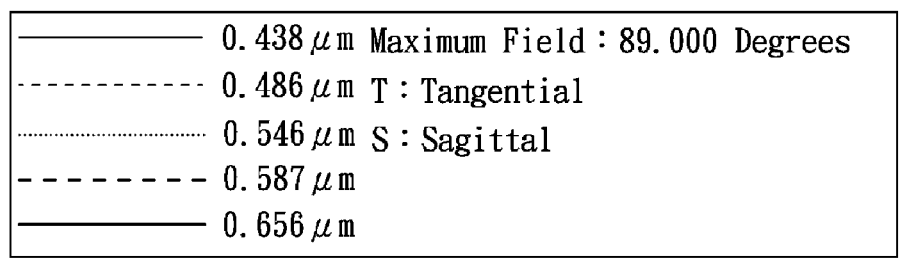
FIG. 2B is a field curvature diagram of the panoramic lens assembly in accordance with the first embodiment of the invention.
Figure 2B:
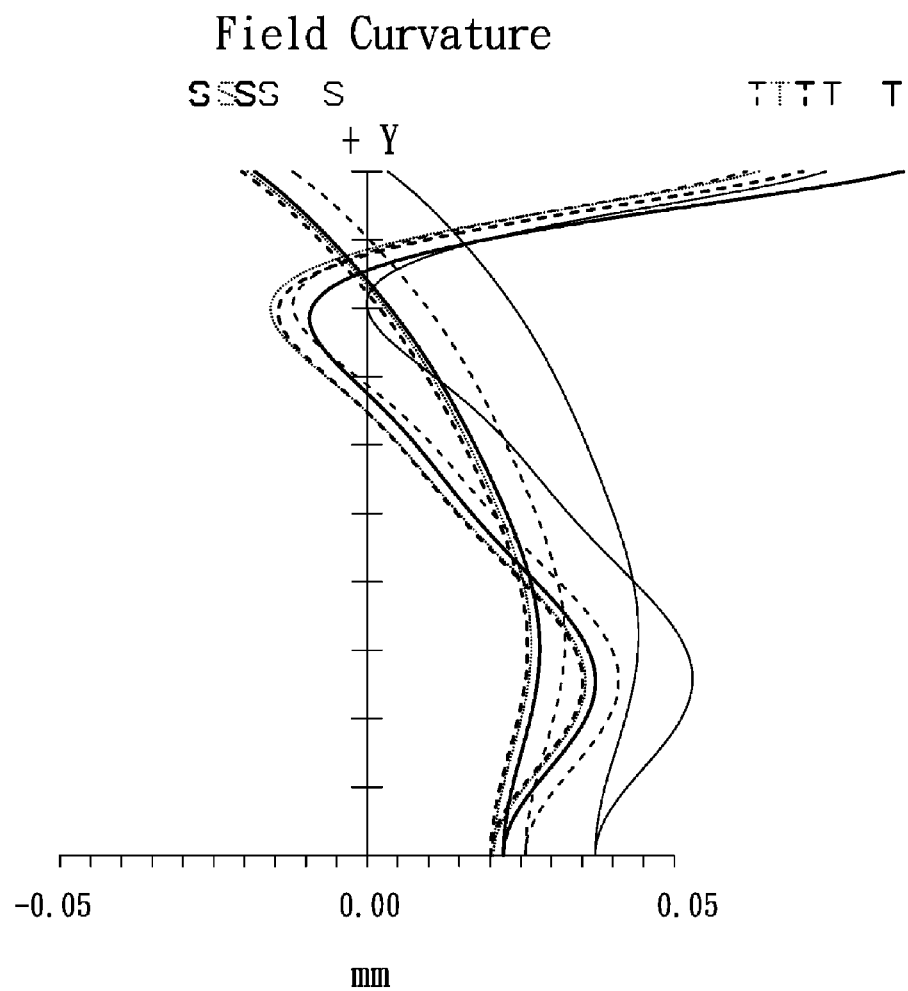
Figure 2C:
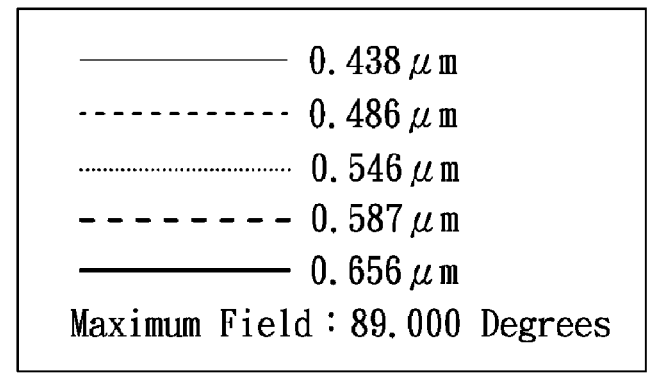
FIG. 2C is a distortion diagram of the panoramic lens assembly in accordance with the first embodiment of the invention.
Figure 2C:
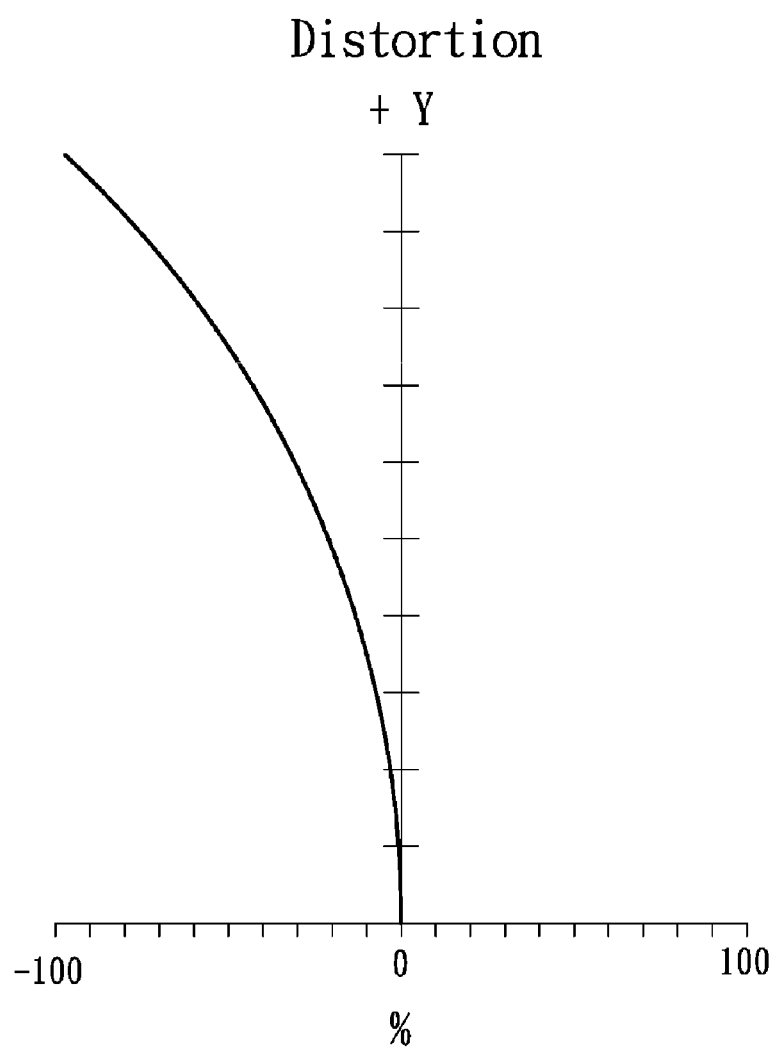

By the above arrangements of the lenses, stop ST11 and the first prism P11, the first lens assembly 11 of the first embodiment can meet the requirements of optical performance as seen in FIGS. 2A-2C, wherein FIG. 2A shows a longitudinal aberration diagram of the first lens assembly 11 in accordance with the first embodiment of the invention, FIG. 2B shows a field curvature diagram of the first lens assembly 11 in accordance with the first embodiment of the invention and FIG. 2C shows a distortion diagram of the first lens assembly 11 in accordance with the first embodiment of the invention.

It can be seen from FIG. 2A that the longitudinal aberration in the first lens assembly 11 of the first embodiment ranges from −0.05 mm to 0.05 mm for the wavelength of 0.438 μm, 0.486 μm, 0.546 μm, 0.587 μm and 0.656 μm. It can be seen from FIG. 2B that the field curvature of tangential direction and sagittal direction in the first lens assembly 11 of the first embodiment ranges from −0.02 mm to 0.09 mm for the wavelength of 0.438 μm, 0.486 μm, 0.546 μm, 0.587 μm and 0.656 μm. It can be seen from FIG. 2C (in which the five lines in the figure almost coincide to appear as if a signal line) that the distortion in the first lens assembly 11 of the first embodiment ranges from −100% to 0% for the wavelength of 0.438 μm, 0.486 μm, 0.546 μm, 0.587 μm and 0.656 μm. It is obvious that the longitudinal aberration, the field curvature and the distortion of the first lens assembly 11 of the first embodiment can be corrected effectively. Therefore, the first lens assembly 11 of the first embodiment is capable of good optical performance.

Therefore, the panoramic lens assembly 1 includes the first lens assembly 11 and the second lens assembly 12. The first lens assembly 11 is used for capturing an image of the first object side. In operation, an image of light rays from the first object side is formed at the first image plane IMA11. The second lens assembly 12 is used for capturing an image of the second object side. In operation, an image of light rays from the second object side is formed at the second image plane IMA12. The first object side and the second object side are opposite to each other, the first image side and the second image side are opposite to each other. When the field of view of the first lens assembly 11 and the second lens assembly 12 is 180 degrees or more, the image on the first image plane IMA11 and the image on the second image plane IMA12 can be processed to form a panoramic image with field of view of 360 degrees. On the other hand, the first lens assembly 11 can operate independently, when the panoramic image is not be taken, an image of the first object side can still be taken independently.

Figure 3:
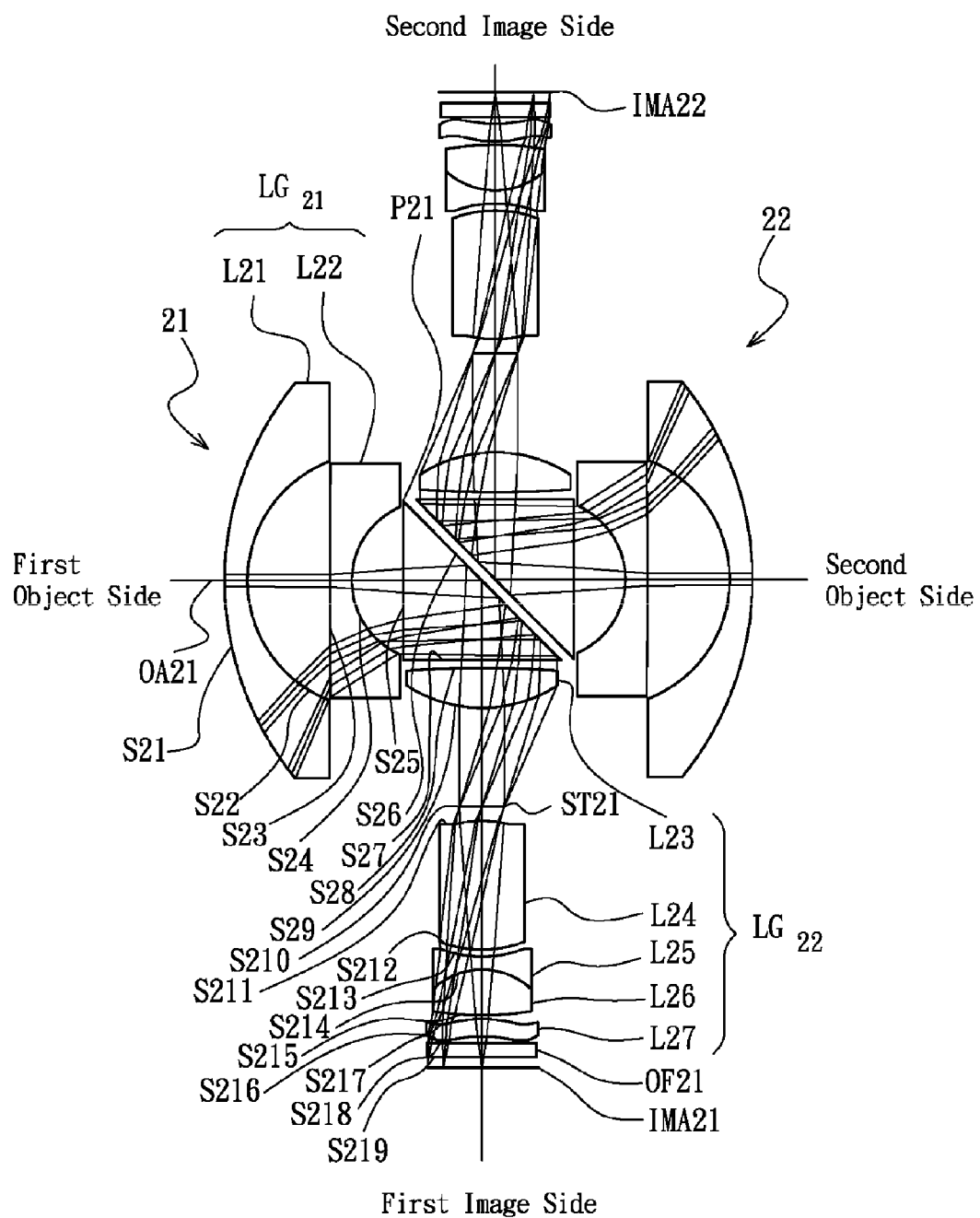
FIG. 3 is a lens layout and optical path diagram of a panoramic lens assembly in accordance with a second embodiment of the invention.

Referring to FIG. 3, FIG. 3 is a lens layout and optical path diagram of a panoramic lens assembly in accordance with a second embodiment of the invention. The panoramic lens assembly 2 includes a first lens assembly 21 and a second lens assembly 22. The first lens assembly 21 is used for capturing an image of a first object side. In operation, an image of light rays from the first object side is formed at a first image plane IMA21. The second lens assembly 22 is used for capturing an image of a second object side. In operation, an image of light rays from the second object side is formed at a second image plane IMA22. The first object side and the second object side are opposite to each other, the first image side and the second image side are opposite to each other. When the field of view of the first lens assembly 21 and the second lens assembly 22 is 180 degrees or more, the image on the first image plane IMA21 and the image on the second image plane IMA22 can be processed to form a panoramic image with field of view of 360 degrees. Therefore, when the first object side and the second object side are fixed, the panoramic lens assembly 2 only needs to shoot once so as to obtain the panoramic image. In the second embodiment, the first lens assembly 21 and the second lens assembly 22 are substantially the same lens assembly. Therefore, the relative parameters of the respective lenses, the aspheric coefficients of the respective lenses, satisfied conditions and the optical properties of the first lens assembly 21 and the second lens assembly 22 are the same. Therefore, only the relative parameters of the respective lenses, the aspheric coefficients of the respective lenses, satisfied conditions and the optical properties of the first lens assembly 21 are described below. The second lens assembly 22 is not described. The first lens assembly 21 includes a first lens group $LG_{21}$, a first prism P21, a second lens group $LG_{22}$ and an optical filter OF21, all of which are arranged in order from a first object side to a first image side along a first optical axis OA21. The first lens group $LG_{21}$ includes a first lens L21 and a second lens L22, all of which are arranged in order from the first object side to the first image side along the first optical axis OA21. The first lens group $LG_{21}$ is with negative refractive power. The first lens L21 is a meniscus lens with negative refractive power, wherein the object side surface S21 is a convex surface, the image side surface S22 is a concave surface and both of the object side surface S21 and image side surface S22 are spherical surfaces. The second lens L22 is a meniscus lens with negative refractive power, wherein the object side surface S23 is a convex surface, the image side surface S24 is a concave surface and both of the object side surface S23 and image side surface S24 are aspheric surfaces. The first prism P21 includes a first incident surface S25, a first reflective surface S26 and a first exit surface S27, all of which are plane surfaces. The light rays from the second lens L22 enter the first prism P21 from the first incident surface S25 and then are reflected by the first reflective surface S26 to change the transmission direction and exit the first prism P21 from the first exit surface S27. The primary function of the first prism P21 is to change the transmission direction of the incident light rays so as to shorten the thickness of the first lens assembly 21. The second lens group $LG_{22}$ includes a third lens L23, a stop ST21, a fourth lens L24, a fifth lens L25, a sixth lens L26 and a seventh lens L27, all of which are arranged in order from the first object side to the first image side along the first optical axis OA21. The second lens group $LG_{22}$ is with positive refractive power. The third lens L23 is a biconvex lens with positive refractive power, wherein the object side surface S28 is a convex surface, the image side surface S29 is a convex surface and both of the object side surface S28 and image side surface S29 are spherical surfaces. The fourth lens L24 is a biconvex lens with positive refractive power, wherein the object side surface S211 is a convex surface, the image side surface S212 is a convex surface and both of the object side surface S211 and image side surface S212 are spherical surfaces. The fifth lens L25 is a biconcave lens with negative refractive power, wherein the object side surface S213 is a concave surface, the image side surface S214 is a concave surface and both of the object side surface S213 and image side surface S214 are spherical surfaces. The sixth lens L26 is a biconvex lens with positive refractive power, wherein the object side surface S214 is a convex surface, the image side surface S215 is a convex surface and both of the object side surface S214 and image side surface S215 are spherical surfaces. The fifth lens L25 and the sixth lens L26 are cemented together to form a cemented lens. The seventh lens L27 is a meniscus lens with positive refractive power, wherein the object side surface S216 is a convex surface, the image side surface S217 is a concave surface and both of the object side surface S216 and image side surface S217 are aspheric surfaces. Both of the object side surface S218 and image side surface S219 of the optical filter OF21 are plane surfaces.

In order to maintain excellent optical performance of the panoramic lens assembly in accordance with the second embodiment of the invention, the panoramic lens assembly 2 satisfies at least one of the following conditions:

$$0.2 \leq TTL2_1/\theta 2_{1m} \leq 0.4 \quad (5)$$

$$-4 \leq f2_1/R2_{12} \leq -0.067 \quad (6)$$

$$4 \leq ER2_{11}/f2_f \leq 8 \quad (7)$$

$$37 \leq Vd2_3 - Vd2_5 \leq 50 \quad (8)$$

wherein $TTL2_1$ is an interval in mm from the object surface S21 of the first lens L21 to the first image plane IMA21 along the first optical axis OA21, $\theta 2_{1m}$ is a half maximum field of view in degree for the first lens assembly 21, $f2_1$ is an effective focal length of the first lens L21, $R2_{12}$ is a radius of curvature of the image side surface S22 of the first lens L21, $ER2_{11}$ is an effective radius of the object side surface S21 of the first lens L21, $f2_f$ is an effective focal length of the first lens assembly 21, $Vd2_3$ is an Abbe number of the third lens L23 and $Vd2_5$ is an Abbe number of the fifth lens L25.

By the above design of the lenses, stop ST21 and the first prism P21, the first lens assembly 21 is provided with a shortened thickness and an effective corrected aberration.

In order to achieve the above purposes and effectively enhance the optical performance, the first lens assembly 21 in accordance with the second embodiment of the invention is provided with the optical specifications shown in Table 3, which include the effective focal length, F-number, radius of curvature of each lens surface, thickness between adjacent surface, refractive index of each lens and Abbe number of each lens. Table 3 shows that the effective focal length is equal to 1.389 mm and F-number is equal to 2.883 for the first lens assembly 21 of the second embodiment of the invention.

TABLE 3

Effective Focal Length = 1.389 mm
F-number = 2.883

| Surface Number | Radius of Curvature (mm) | Thickness (mm) | Nd | Vd | Remark |
|---|---|---|---|---|---|
| S21 | 12.572 | 0.921 | 1.79 | 45 | The First Lens L21 |
| S22 | 5.216 | 3.351 | | | |

TABLE 3-continued

Effective Focal Length = 1.389 mm
F-number = 2.883

| Surface Number | Radius of Curvature (mm) | Thickness (mm) | Nd | Vd | Remark |
|---|---|---|---|---|---|
| S23 | 74.944 | 0.9 | 1.72 | 44.9 | The Second Lens L22 |
| S24 | 3.087 | 2.109 | | | |
| S25 | ∞ | 3.23 | 1.82 | 24.2 | The First Prism P21 |
| S26 | ∞ | 3.23 | 1.82 | 24.2 | |
| S27 | ∞ | 0.3 | | | |
| S28 | 33.066 | 1.643 | 1.50 | 65 | The Third Lens L23 |
| S29 | −5.641 | 4.029 | | | |
| S210 | ∞ | 0.586 | | | Stop ST21 |
| S211 | 5.85 | 5.235 | 1.82 | 46.6 | The Fourth Lens L24 |
| S212 | −5.119 | 0.274 | | | |
| S213 | −5.119 | 0.547 | 1.85 | 22 | The Fifth Lens L25 |
| S214 | 2.899 | 1.847 | 1.81 | 46.6 | The Sixth Lens L26 |
| S215 | −13.156 | 0.162 | | | |
| S216 | 4.709 | 0.719 | 1.86 | 22 | The Seventh Lens L27 |
| S217 | 6.195 | 0.236 | | | |
| S218 | ∞ | 0.6 | 1.52 | 64.16 | Optical Filter OF21 |
| S219 | ∞ | 0.436 | | | |

The aspheric surface sag z of each lens in table 3 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}$$

where c is curvature, h is the vertical distance from the lens surface to the optical axis, k is conic constant and A, B, C, D, E and F are aspheric coefficients.

In the second embodiment, the conic constant k and the aspheric coefficients A, B, C, D, E, F of each surface are shown in Table 4.

TABLE 4

| Surface Number | k | A | B | C | D | E | F |
|---|---|---|---|---|---|---|---|
| S23 | 0 | −3.619E−04 | 6.185E−06 | 0 | 0 | 0 | 0 |
| S24 | −0.1727 | 7.8137E−04 | −6.159E−05 | 0 | 0 | 0 | 0 |
| S216 | −21.367 | 0.0145 | −5.774E−03 | 1.636E−04 | 9.822E−05 | −2.772E−05 | −1.204E−06 |
| S217 | 0 | −5.396E−03 | −1.85E−03 | −3.86E−04 | 1.373E−05 | 1.911E−05 | −2.231E−06 |

For the first lens assembly 21 of the second embodiment, the interval $TTL2_1$ from the object side surface S21 of the first lens L21 to the first image plane IMA21 along the first optical axis OA21 is equal to 30.366 mm, the half maximum field of view $\theta 2_{1m}$ for the first lens assembly 21 is equal to 95 degrees, the effective focal length $f2_1$ of the first lens L21 is equal to −11.884 mm, the radius of curvature $R2_{12}$ of the image side surface S22 of the first lens L21 is equal to 5.216 mm, the effective radius $ER2_{11}$ of the object side surface S21 of the first lens L21 is equal to 8.061 mm, the effective focal length $f2_f$ of the first lens assembly 21 is equal to 1.389 mm, the Abbe number $Vd2_3$ of the third lens L23 is equal to 65 and the Abbe number $Vd2_5$ of the fifth lens L25 is equal to 22. According to the above data, the following values can be obtained:

$$TTL2_1/\theta2_{1m}=0.32,$$

$$f2_1/R2_{12}=-2.278,$$

$$ER2_{11}/f2_f=5.8,$$

$$Vd2_3-Vd2_5=43$$

which respectively satisfy the above conditions (5)-(8).

Figure 4A:
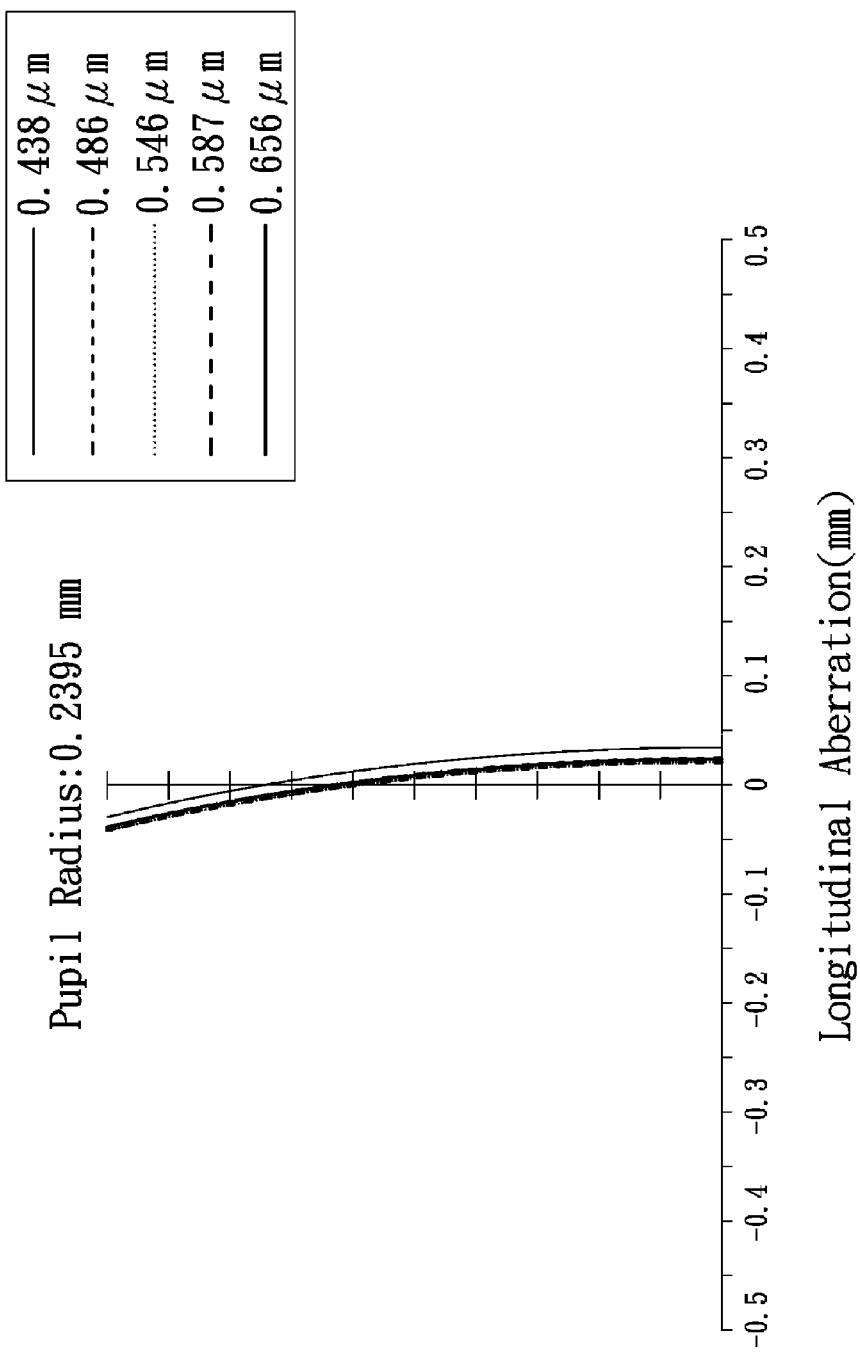
FIG. 4A depicts a longitudinal aberration diagram of the panoramic lens assembly in accordance with the second embodiment of the invention.
Figure 4B:
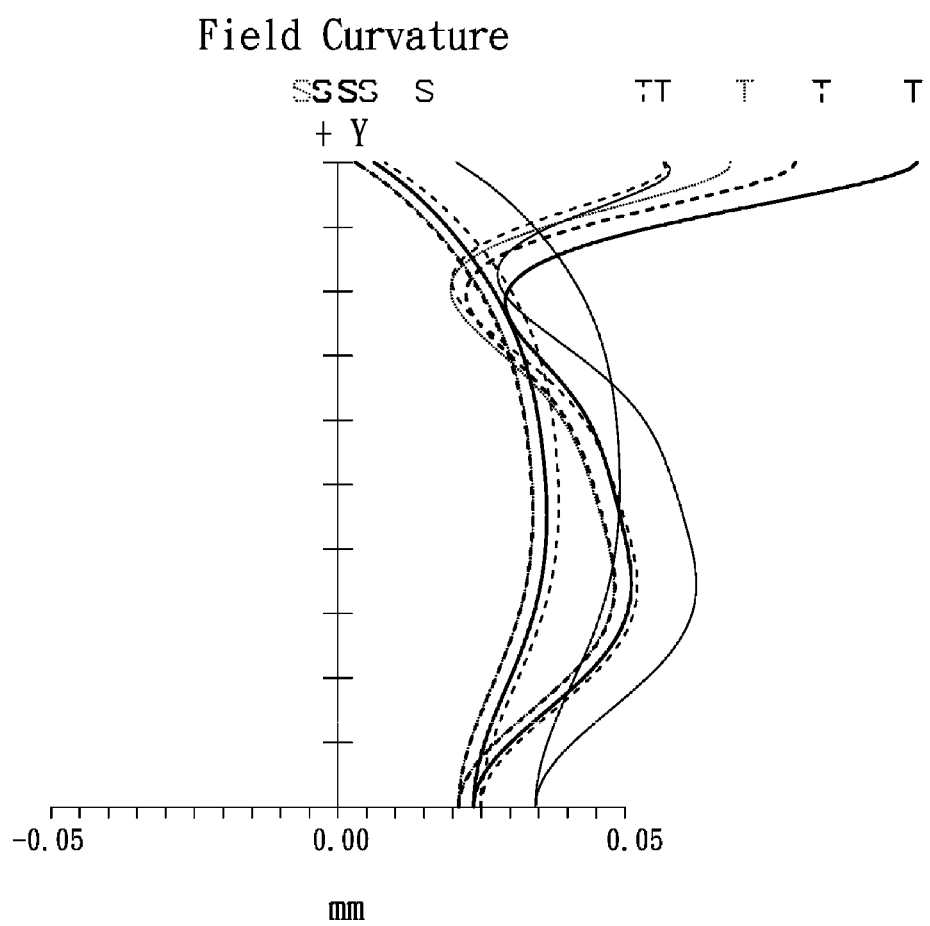
FIG. 4B is a field curvature diagram of the panoramic lens assembly in accordance with the second embodiment of the invention.
Figure 4C:
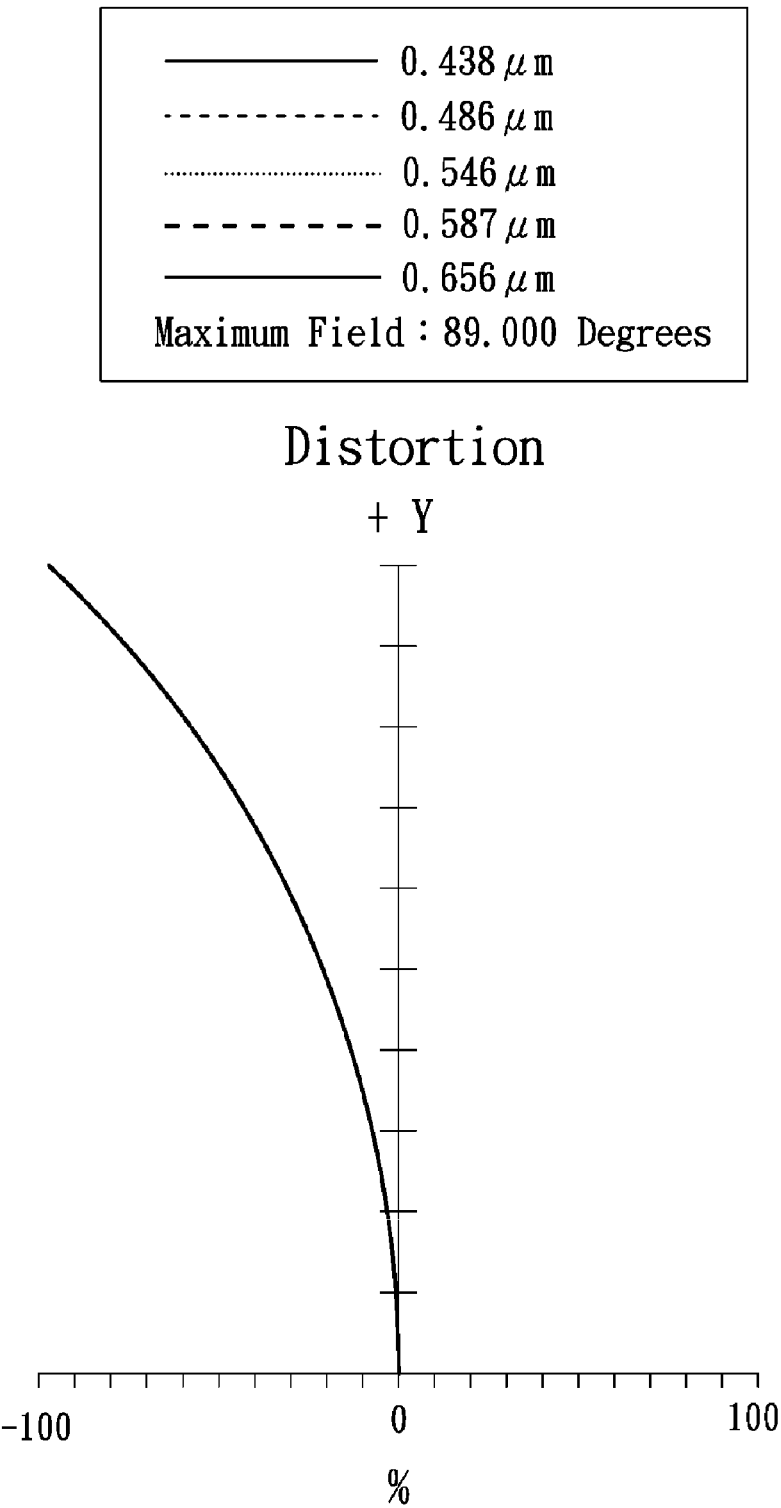
FIG. 4C is a distortion diagram of the panoramic lens assembly in accordance with the second embodiment of the invention.

By the above arrangements of the lenses, stop ST21 and the first prism P21, the first lens assembly 21 of the second embodiment can meet the requirements of optical performance as seen in FIGS. 4A-4C, wherein FIG. 4A shows a longitudinal aberration diagram of the first lens assembly 21 in accordance with the second embodiment of the invention, FIG. 4B shows a field curvature diagram of the first lens assembly 21 in accordance with the second embodiment of the invention and FIG. 4C shows a distortion diagram of the first lens assembly 21 in accordance with the second embodiment of the invention.

It can be seen from FIG. 4A that the longitudinal aberration in the first lens assembly 21 of the second embodiment ranges from −0.05 mm to 0.05 mm for the wavelength of 0.438 μm, 0.486 μm, 0.546 μm, 0.587 μm and 0.656 μm. It can be seen from FIG. 4B that the field curvature of tangential direction and sagittal direction in the first lens assembly 21 of the second embodiment ranges from 0 mm to 0.1 mm for the wavelength of 0.438 μm, 0.486 μm, 0.546 μm, 0.587 μm and 0.656 μm. It can be seen from FIG. 4C (in which the five lines in the figure almost coincide to appear as if a signal line) that the distortion in the first lens assembly 21 of the second embodiment ranges from −100% to 0% for the wavelength of 0.438 μm, 0.486 μm, 0.546 μm, 0.587 μm and 0.656 μm. It is obvious that the longitudinal aberration, the field curvature and the distortion of the first lens assembly 21 of the second embodiment can be corrected effectively. Therefore, the first lens assembly 21 of the second embodiment is capable of good optical performance.

Therefore, the panoramic lens assembly 2 includes the first lens assembly 21 and the second lens assembly 22. The first lens assembly 21 is used for capturing an image of the first object side. In operation, an image of light rays from the first object side is formed at the first image plane IMA21. The second lens assembly 22 is used for capturing an image of the second object side. In operation, an image of light rays from the second object side is formed at the second image plane IMA22. The first object side and the second object side are opposite to each other, the first image side and the second image side are opposite to each other. When the field of view of the first lens assembly 21 and the second lens assembly 22 is 180 degrees or more, the image on the first image plane IMA21 and the image on the second image plane IMA22 can be processed to form a panoramic image with field of view of 360 degrees. On the other hand, the first lens assembly 21 can operate independently, when the panoramic image is not be taken, an image of the first object side can still be taken independently.

Figure 5:
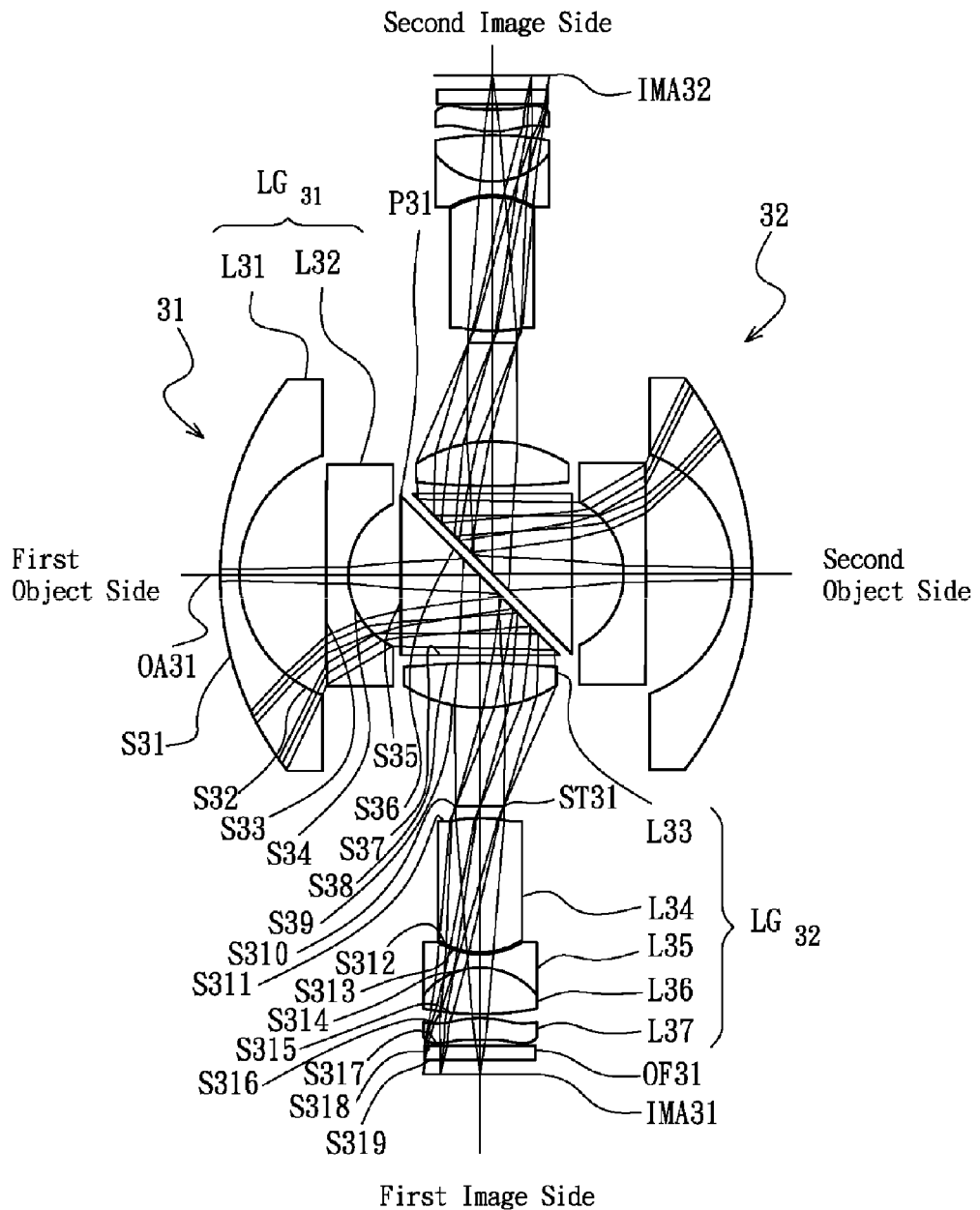
FIG. 5 is a lens layout and optical path diagram of a panoramic lens assembly in accordance with a third embodiment of the invention.

Referring to FIG. 5, FIG. 5 is a lens layout and optical path diagram of a panoramic lens assembly in accordance with a third embodiment of the invention. The panoramic lens assembly 3 includes a first lens assembly 31 and a second lens assembly 32. The first lens assembly 31 is used for capturing an image of a first object side. In operation, an image of light rays from the first object side is formed at a first image plane IMA31. The second lens assembly 32 is used for capturing an image of a second object side. In operation, an image of light rays from the second object side is formed at a second image plane IMA32. The first object side and the second object side are opposite to each other, the first image side and the second image side are opposite to each other. When the field of view of the first lens assembly 31 and the second lens assembly 32 is 180 degrees or more, the image on the first image plane IMA31 and the image on the second image plane IMA32 can be processed to form a panoramic image with field of view of 360 degrees. Therefore, when the first object side and the second object side are fixed, the panoramic lens assembly 3 only needs to shoot once so as to obtain the panoramic image. In the third embodiment, the first lens assembly 31 and the second lens assembly 32 are substantially the same lens assembly. Therefore, the relative parameters of the respective lenses, the aspheric coefficients of the respective lenses, satisfied conditions and the optical properties of the first lens assembly 31 and the second lens assembly 32 are the same. Therefore, only the relative parameters of the respective lenses, the aspheric coefficients of the respective lenses, satisfied conditions and the optical properties of the first lens assembly 31 are described below. The second lens assembly 32 is not described. The first lens assembly 31 includes a first lens group $LG_{31}$, a first prism P31, a second lens group $LG_{32}$ and an optical filter OF31, all of which are arranged in order from a first object side to a first image side along a first optical axis OA31. The first lens group $LG_{31}$ includes a first lens L31 and a second lens L32, all of which are arranged in order from the first object side to the first image side along the first optical axis OA31. The first lens group $LG_{31}$ is with negative refractive power. The first lens L31 is a meniscus lens with negative refractive power, wherein the object side surface S31 is a convex surface, the image side surface S32 is a concave surface and both of the object side surface S31 and image side surface S32 are spherical surfaces. The second lens L32 is a meniscus lens with negative refractive power, wherein the object side surface S33 is a convex surface, the image side surface S34 is a concave surface and both of the object side surface S33 and image side surface S34 are aspheric surfaces. The first prism P31 includes a first incident surface S35, a first reflective surface S36 and a first exit surface S37, all of which are plane surfaces. The light rays from the second lens L32 enter the first prism P31 from the first incident surface S35 and then are reflected by the first reflective surface S36 to change the transmission direction and exit the first prism P31 from the first exit surface S37. The primary function of the first prism P31 is to change the transmission direction of the incident light rays so as to shorten the thickness of the first lens assembly 31. The second lens group $LG_{32}$ includes a third lens L33, a stop ST31, a fourth lens L34, a fifth lens L35, a sixth lens L36 and a seventh lens L37, all of which are arranged in order from the first object side to the first image side along the first optical axis OA31. The second lens group $LG_{32}$ is with positive refractive power. The third lens L33 is a biconvex lens with positive refractive power, wherein the object side surface S38 is a convex surface, the image side surface S39 is a convex surface and both of the object side surface S38 and image side surface S39 are spherical surfaces. The fourth lens L34 is a biconvex lens with positive refractive power, wherein the object side surface S311 is a convex surface, the image side surface S312 is a convex surface and both of the object side surface S311 and image side surface S312 are spherical surfaces. The fifth lens L35 is a biconcave lens with negative refractive power, wherein the object side surface S313 is a concave surface, the image side surface S314 is a concave surface and both of the object side surface S313 and image side surface S314 are spherical surfaces. The sixth lens L36 is a biconvex lens with positive refractive power, wherein the object side surface S314 is a convex surface, the image side surface S315 is a convex surface and both of the object side surface S314 and image side surface S315 are spherical surfaces. The fifth lens L35 and the sixth lens L36 are cemented together to form a cemented lens. The seventh lens L37 is a meniscus lens with positive refractive power, wherein the object side surface S316 is a convex surface, the image side surface S317 is a concave surface and both of the object side surface S316 and image side surface S317 are aspheric surfaces. Both of the object side surface S318 and image side surface S319 of the optical filter OF31 are plane surfaces.

In order to maintain excellent optical performance of the panoramic lens assembly in accordance with the third embodiment of the invention, the panoramic lens assembly 3 satisfies at least one of the following conditions:

$$0.2 \leq TTL3_1/\theta3_{1m} \leq 0.4 \quad (9)$$

$$-4 \leq f3_1/R3_{12} \leq -0.067 \quad (10)$$

$$4 \leq ER3_{11}/f3_f \leq 8 \quad (11)$$

$$37 \leq Vd3_3 - Vd3_5 \leq 50 \quad (12)$$

wherein $TTL3_1$ is an interval in mm from the object surface S31 of the first lens L31 to the first image plane IMA31 along the first optical axis OA31, $\theta3_{1m}$ is a half maximum field of view in degree for the first lens assembly 31, $f3_1$ is an effective focal length of the first lens L31, $R3_{12}$ is a radius of curvature of the image side surface S32 of the first lens L31, $ER3_{11}$ is an effective radius of the object side surface S31 of the first lens L31, $f3_f$ is an effective focal length of the first lens assembly 31, $Vd3_3$ is an Abbe number of the third lens L33 and $Vd3_5$ is an Abbe number of the fifth lens L35.

By the above design of the lenses, stop ST31 and the first prism P31, the first lens assembly 31 is provided with a shortened thickness and an effective corrected aberration.

In order to achieve the above purposes and effectively enhance the optical performance, the first lens assembly 31 in accordance with the third embodiment of the invention is provided with the optical specifications shown in Table 5, which include the effective focal length, F-number, radius of curvature of each lens surface, thickness between adjacent surface, refractive index of each lens and Abbe number of each lens. Table 5 shows that the effective focal length is equal to 1.39 mm and F-number is equal to 2.88 for the first lens assembly 31 of the third embodiment of the invention.

TABLE 5

Effective Focal Length = 1.39 mm
F-number = 2.88

| Surface Number | Radius of Curvature (mm) | Thickness (mm) | Nd | Vd | Remark |
|---|---|---|---|---|---|
| S31 | 12.803 | 0.782 | 1.82 | 44 | The First Lens L31 |
| S32 | 5.17 | 3.495 | | | |
| S33 | 73.983 | 0.9 | 1.76 | 45 | The Second Lens L32 |
| S34 | 3.082 | 2.112 | | | |
| S35 | ∞ | 3.21 | 1.83 | 23.8 | The First Prism P31 |
| S36 | ∞ | 3.21 | 1.83 | 23.8 | |
| S37 | ∞ | 0.371 | | | |
| S38 | 30.593 | 1.78 | 1.52 | 64.2 | The Third Lens L33 |
| S39 | −5.656 | 3.978 | | | |
| S310 | ∞ | 0.48 | | | Stop ST31 |
| S311 | 5.651 | 5.45 | 1.8 | 40 | The Fourth Lens L34 |
| S312 | −3.067 | 0.05 | | | |
| S313 | −3.067 | 0.549 | 1.85 | 23 | The Fifth Lens L35 |
| S314 | 2.915 | 1.887 | 1.75 | 60 | The Sixth Lens L36 |
| S315 | −11.128 | 0.162 | | | |
| S316 | 4.812 | 0.841 | 1.85 | 23.8 | The Seventh Lens L37 |
| S317 | 6.226 | 0.236 | | | |
| S318 | ∞ | 0.6 | 1.52 | 64.16 | Optical Filter OF31 |
| S319 | ∞ | 0.568 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the third embodiment, the conic constant k and the aspheric coefficients A, B, C, D, E, F of each surface are shown in Table 6.

TABLE 6

| Surface Number | k | A | B | C | D | E | F |
|---|---|---|---|---|---|---|---|
| S33 | 0 | −3.479E−04 | 6.415E−06 | 0 | 0 | 0 | 0 |
| S34 | −0.167 | 6.608E−04 | −5.473E−05 | 0 | 0 | 0 | 0 |
| S316 | −20.875 | 0.0146 | −5.794E−03 | 1.573E−04 | 9.76E−05 | −2.76E−05 | 1.285E−06 |
| S317 | 0 | −5.382E−03 | −1.845E−03 | −3.854E−04 | 1.377E−05 | 1.912E−05 | −2.227E−06 |

For the first lens assembly 31 of the third embodiment, the interval $TTL3_1$ from the object side surface S31 of the first lens L31 to the first image plane IMA31 along the first optical axis OA31 is equal to 30.6696 mm, the half maximum field of view $\theta3_{1m}$ for the first lens assembly 31 is equal to 95 degrees, the effective focal length $f3_1$ of the first lens L31 is equal to −11.03 mm, the radius of curvature $R3_{12}$ of the image side surface S32 of the first lens L31 is equal to 5.17 mm, the effective radius $ER3_{11}$ of the object side surface S31 of the first lens L31 is equal to 7.919 mm, the effective focal length f3$_f$ of the first lens assembly 31 is equal to 1.39 mm, the Abbe number Vd3$_3$ of the third lens L33 is equal to 64.2 and the Abbe number Vd3$_5$ of the fifth lens L35 is equal to 23. According to the above data, the following values can be obtained:

$$TTL3_1/\theta3_{1m}=0.32,$$

$$f3_1/R3_{12}=-2.113,$$

$$ER3_{11}/f3_f=5.7,$$

$$Vd3_3-Vd3_5=41.2$$

which respectively satisfy the above conditions (9)-(12).

Figure 6A:
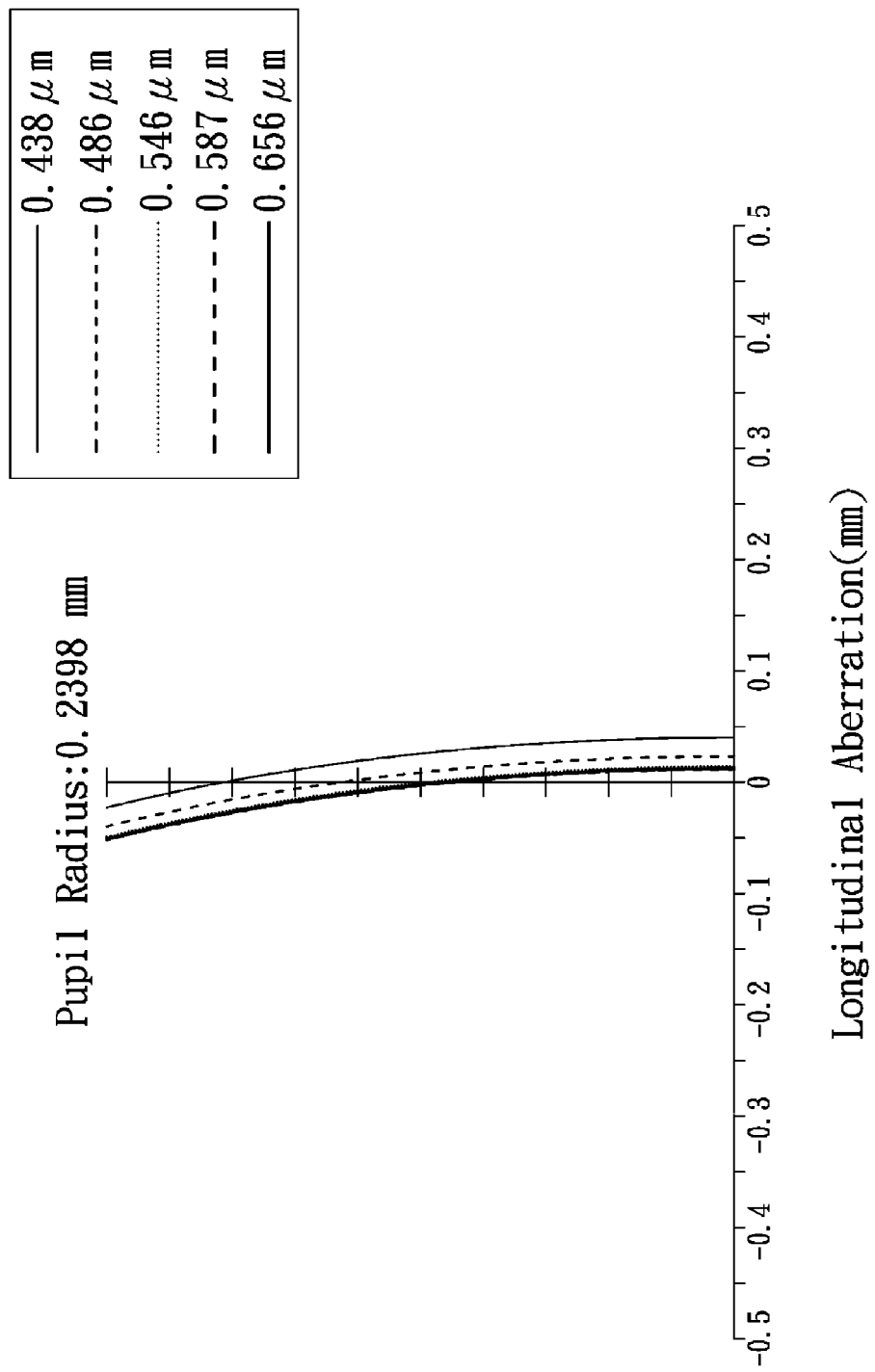
FIG. 6A depicts a longitudinal aberration diagram of the panoramic lens assembly in accordance with the third embodiment of the invention.
Figure 6B:
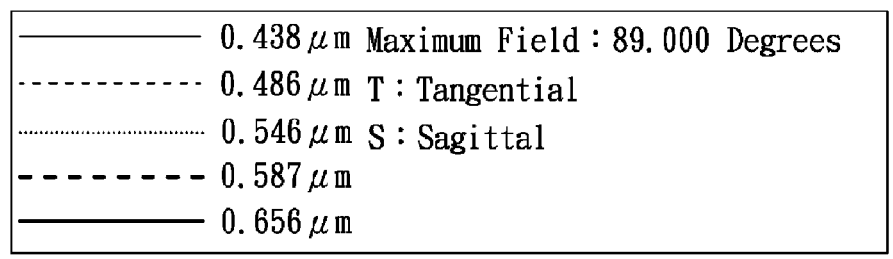
FIG. 6B is a field curvature diagram of the panoramic lens assembly in accordance with the third embodiment of the invention.
Figure 6B:
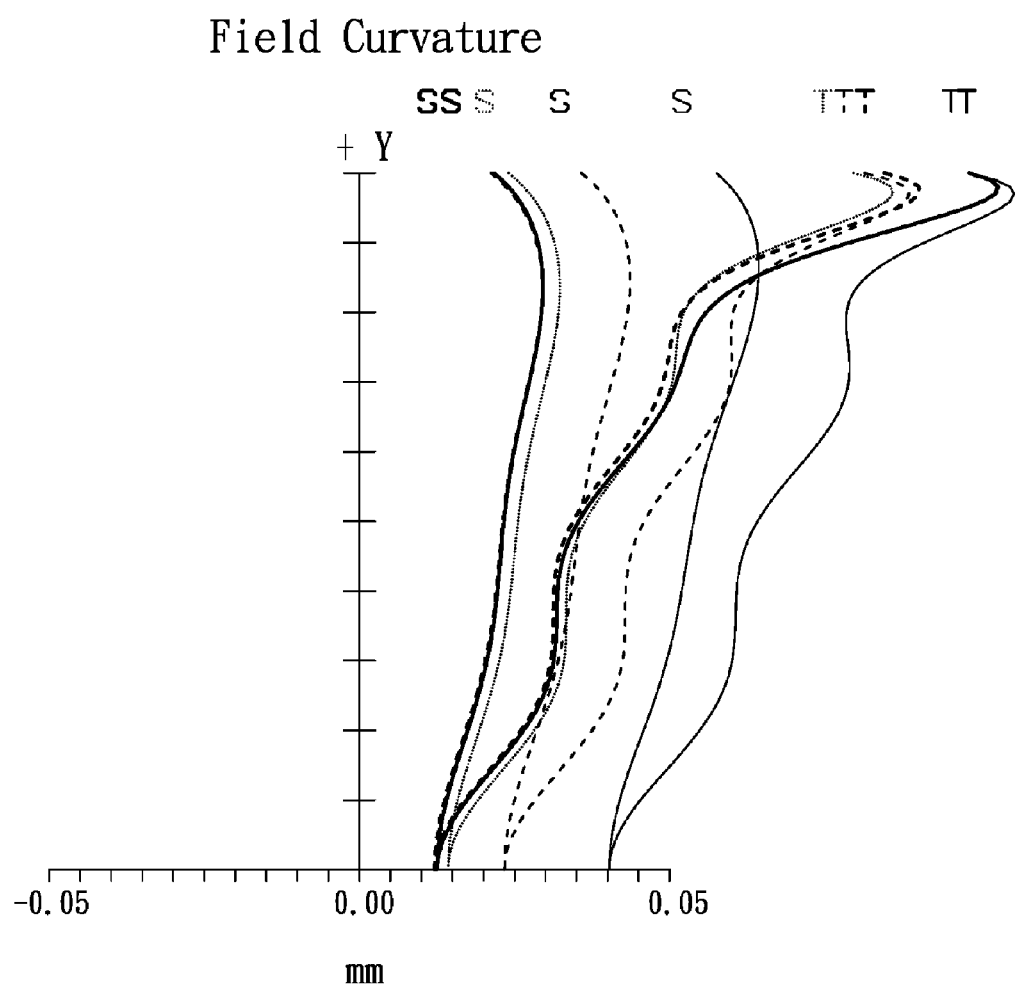
Figure 6C:
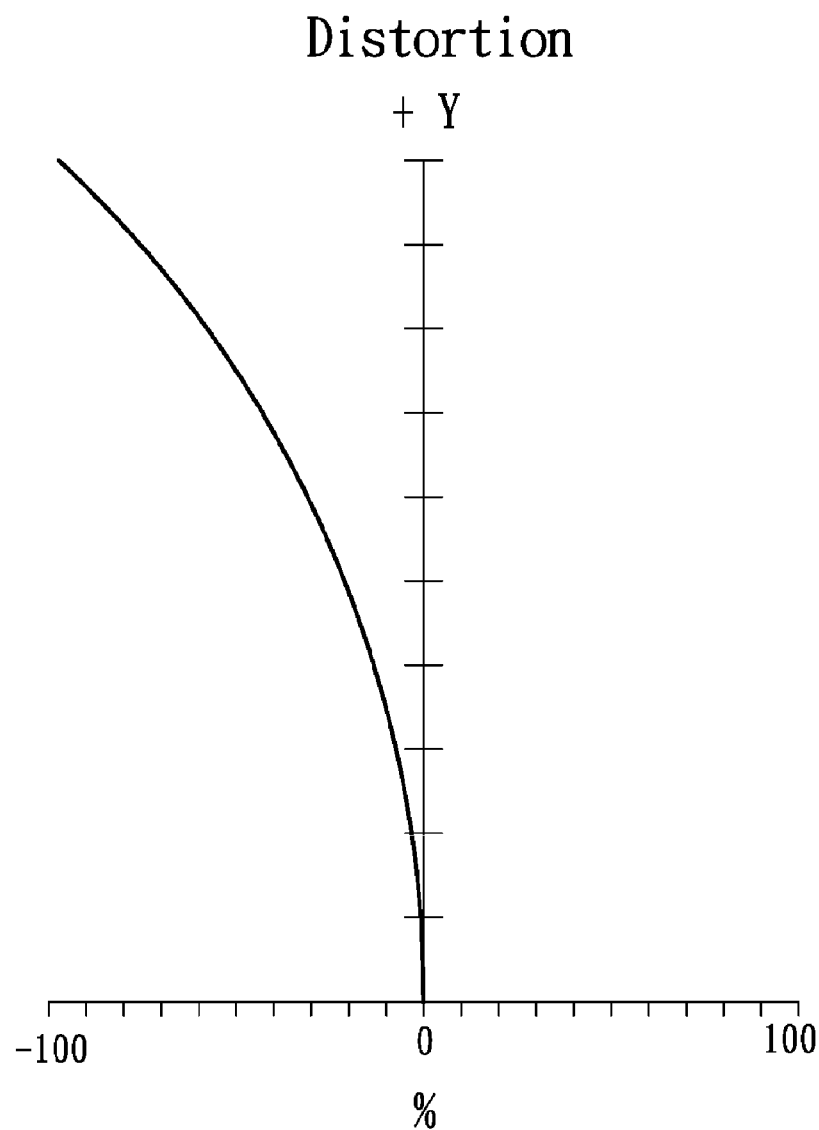
FIG. 6C is a distortion diagram of the panoramic lens assembly in accordance with the third embodiment of the invention.

By the above arrangements of the lenses, stop ST31 and the first prism P31, the first lens assembly 31 of the third embodiment can meet the requirements of optical performance as seen in FIGS. 6A-6C, wherein FIG. 6A shows a longitudinal aberration diagram of the first lens assembly 31 in accordance with the third embodiment of the invention, FIG. 6B shows a field curvature diagram of the first lens assembly 31 in accordance with the third embodiment of the invention and FIG. 6C shows a distortion diagram of the first lens assembly 31 in accordance with the third embodiment of the invention.

It can be seen from FIG. 6A that the longitudinal aberration in the first lens assembly 31 of the third embodiment ranges from −0.05 mm to 0.05 mm for the wavelength of 0.438 µm, 0.486 µm, 0.546 µm, 0.587 µm and 0.656 µm. It can be seen from FIG. 6B that the field curvature of tangential direction and sagittal direction in the first lens assembly 31 of the third embodiment ranges from 0.01 mm to 0.11 mm for the wavelength of 0.438 µm, 0.486 µm, 0.546 µm, 0.587 µm and 0.656 µm. It can be seen from FIG. 6C (in which the five lines in the figure almost coincide to appear as if a signal line) that the distortion in the first lens assembly 31 of the third embodiment ranges from −100% to 0% for the wavelength of 0.438 µm, 0.486 µm, 0.546 µm, 0.587 µm and 0.656 µm. It is obvious that the longitudinal aberration, the field curvature and the distortion of the first lens assembly 31 of the third embodiment can be corrected effectively. Therefore, the first lens assembly 31 of the third embodiment is capable of good optical performance.

Therefore, the panoramic lens assembly 3 includes the first lens assembly 31 and the second lens assembly 32. The first lens assembly 31 is used for capturing an image of the first object side. In operation, an image of light rays from the first object side is formed at the first image plane IMA31. The second lens assembly 32 is used for capturing an image of the second object side. In operation, an image of light rays from the second object side is formed at the second image plane IMA32. The first object side and the second object side are opposite to each other, the first image side and the second image side are opposite to each other. When the field of view of the first lens assembly 31 and the second lens assembly 32 is 180 degrees or more, the image on the first image plane IMA31 and the image on the second image plane IMA32 can be processed to form a panoramic image with field of view of 360 degrees. On the other hand, the first lens assembly 31 can operate independently, when the panoramic image is not be taken, an image of the first object side can still be taken independently.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A panoramic lens assembly, comprising a first lens assembly, wherein:
   the first lens assembly comprises a first lens group, a first prism and a second lens group, all of which are arranged in order from a first object side to a first image side along a first optical axis, wherein:
   the first lens group is with negative refractive power and comprises a first lens with negative refractive power and a second lens with negative refractive power, all of which are arranged in order from the first object side to the first image side along the first optical axis;
   the first prism comprises a first incident surface, a first reflective surface and a first exit surface, wherein the first incident surface faces an image side surface of the second lens;
   the second lens group is with positive refractive power and comprises a third lens, a fourth lens, a fifth lens, a sixth lens and a seventh lens, all of which are arranged in order from the first object side to the first image side along the first optical axis, wherein an object side surface of the third lens faces the first exit surface of the first prism and a refractive power of the third lens is opposite to a refractive power of the fifth lens; and
   the first lens assembly satisfies: $0.2 \leq TTL_1/\theta_{1m} \leq 0.4$, wherein $TTL_1$ is an interval in mm from an object surface of the first lens to a first image plane along the first optical axis and $\theta_{1m}$ is a half maximum field of view in degree for the first lens assembly.

2. The panoramic lens assembly as claimed in claim 1, wherein the seventh lens is an aspheric lens and a sign of the refractive power of the third, fourth, fifth, sixth and seventh lens is positive, positive, negative, positive and positive.

3. The panoramic lens assembly as claimed in claim 1, wherein the first lens assembly satisfies:

$$-4 \leq f_1/R_{12} \leq -0.667,$$

wherein $f_1$ is an effective focal length of the first lens and $R_{12}$ is a radius of curvature of an image side surface of the first lens.

4. The panoramic lens assembly as claimed in claim 1, wherein the first lens assembly satisfies:

$$4 \leq ER_{11}/f_f \leq 8,$$

wherein $ER_{11}$ is an effective radius of an object side surface of the first lens and $f_f$ is an effective focal length of the first lens assembly.

5. The panoramic lens assembly as claimed in claim 1, wherein the first lens assembly further comprises a stop disposed between the third lens and the fourth lens.

6. The panoramic lens assembly as claimed in claim 1, further comprising a second lens assembly, wherein the second lens assembly comprises a third lens group, a second prism and a fourth lens group, all of which are arranged in order from a second object side to a second image side along a second optical axis, wherein:
   the third lens group is with negative refractive power and comprises an eighth lens with negative refractive power and a ninth lens with negative refractive power, all of which are arranged in order from the second object side to the second image side along the second optical axis;

the second prism comprises a second incident surface, a second reflective surface and a second exit surface, wherein the second incident surface faces an image side surface of the ninth lens;

the fourth lens group is with positive refractive power and comprises a tenth lens, an eleventh lens, a twelfth lens, a thirteenth lens and a fourteenth lens, all of which are arranged in order from the second object side to the second image side along the second optical axis, wherein an object side surface of the tenth lens faces the second exit surface of the second prism and a refractive power of the tenth lens is opposite to a refractive power of the twelfth lens; and the first object side and the second object side are opposite to each other, the first image side and the second image side are opposite to each other.

7. The panoramic lens assembly as claimed in claim 6, wherein the second lens assembly satisfies:

$0.2 \leq TTL_2/\theta_{2m} \leq 0.4$, $37 \leq Vd_{10} - Vd_{12} \leq 50$, wherein $TTL_2$ is an interval in mm from an object surface of the eighth lens to a second image plane along the second optical axis, $\theta_{2m}$ is a half maximum field of view in degree for the second lens assembly, $Vd_{10}$ is an Abbe number of the tenth lens and $Vd_{12}$ is an Abbe number of the twelfth lens.

8. The panoramic lens assembly as claimed in claim 6, wherein the second lens assembly satisfies:

$-4 \leq f_8/R_{82} \leq -0.667$, $4 \leq ER_{81}/f_s \leq 8$, wherein $f_8$ is an effective focal length of the eighth lens and $R_{82}$ is a radius of curvature of an image side surface of the eighth lens, $ER_{81}$ is an effective radius of an object side surface of the eighth lens and $f_s$ is an effective focal length of the second lens assembly.

9. The panoramic lens assembly as claimed in claim 6, wherein the fourteenth lens is an aspheric lens and a sign of the refractive power of the tenth, eleventh, twelfth, thirteenth and fourteenth lens is positive, positive, negative, positive and positive.

10. The panoramic lens assembly as claimed in claim 6, wherein the second lens assembly further comprises a stop disposed between the tenth lens and the eleventh lens.

11. A panoramic lens assembly, comprising a first lens assembly, wherein:

the first lens assembly comprises a first lens group, a first prism and a second lens group, all of which are arranged in order from a first object side to a first image side along a first optical axis, wherein:

the first lens group is with negative refractive power and comprises a first lens with negative refractive power and a second lens with negative refractive power, all of which are arranged in order from the first object side to the first image side along the first optical axis;

the first prism comprises a first incident surface, a first reflective surface and a first exit surface, wherein the first incident surface faces an image side surface of the second lens;

the second lens group is with positive refractive power and comprises a third lens, a fourth lens, a fifth lens, a sixth lens and a seventh lens, all of which are arranged in order from the first object side to the first image side along the first optical axis, wherein an object side surface of the third lens faces the first exit surface of the first prism and a refractive power of the third lens is opposite to a refractive power of the fifth lens; and the third lens and the fifth lens satisfy: $37 \leq Vd_3 - Vd_5 \leq 50$, wherein $Vd_3$ is an Abbe number of the third lens and $Vd_5$ is an Abbe number of the fifth lens.

12. The panoramic lens assembly as claimed in claim 11, wherein the seventh lens is an aspheric lens and a sign of the refractive power of the third, fourth, fifth, sixth and seventh lens is positive, positive, negative, positive and positive.

13. The panoramic lens assembly as claimed in claim 11, wherein the first lens assembly satisfies:

$-4 \leq f_1/R_{12} \leq -0.667$, wherein $f_1$ is an effective focal length of the first lens and $R_{12}$ is a radius of curvature of an image side surface of the first lens.

14. The panoramic lens assembly as claimed in claim 11, wherein the first lens assembly satisfies:

$4 \leq ER_{11}/f_f \leq 8$, wherein $ER_{11}$ is an effective radius of an object side surface of the first lens and $f_f$ is an effective focal length of the first lens assembly.

15. The panoramic lens assembly as claimed in claim 11, wherein the first lens assembly further comprises a stop disposed between the third lens and the fourth lens.

16. The panoramic lens assembly as claimed in claim 11, further comprising a second lens assembly, wherein the second lens assembly comprises a third lens group, a second prism and a fourth lens group, all of which are arranged in order from a second object side to a second image side along a second optical axis, wherein:

the third lens group is with negative refractive power and comprises an eighth lens with negative refractive power and a ninth lens with negative refractive power, all of which are arranged in order from the second object side to the second image side along the second optical axis;

the second prism comprises a second incident surface, a second reflective surface and a second exit surface, wherein the second incident surface faces an image side surface of the ninth lens;

the fourth lens group is with positive refractive power and comprises a tenth lens, an eleventh lens, a twelfth lens, a thirteenth lens and a fourteenth lens, all of which are arranged in order from the second object side to the second image side along the second optical axis, wherein an object side surface of the tenth lens faces the second exit surface of the second prism and a refractive power of the tenth lens is opposite to a refractive power of the twelfth lens; and the first object side and the second object side are opposite to each other, the first image side and the second image side are opposite to each other.

17. The panoramic lens assembly as claimed in claim 16, wherein the second lens assembly satisfies:

$0.2 \leq TTL_2/\theta_{2m} \leq 0.4$, $37 \leq Vd_{10} - Vd_{12} \leq 50$, wherein $TTL_2$ is an interval in mm from an object surface of the eighth lens to a second image plane along the second optical axis, $\theta_{2m}$ is a half maximum field of view in degree for the second lens assembly, $Vd_{10}$ is an Abbe number of the tenth lens and $Vd_{12}$ is an Abbe number of the twelfth lens.

18. The panoramic lens assembly as claimed in claim 16, wherein the second lens assembly satisfies:

$-4 \leq f_8/R_{82} \leq -0.667$, $4 \leq ER_{81}/f_s \leq 8$, wherein $f_8$ is an effective focal length of the eighth lens and $R_{82}$ is a radius of curvature of an image side surface of the eighth lens, $ER_{81}$ is an effective radius of an object side surface of the eighth lens and $f_s$ is an effective focal length of the second lens assembly.

19. The panoramic lens assembly as claimed in claim 16, wherein the fourteenth lens is an aspheric lens and a sign of the refractive power of the tenth, eleventh, twelfth, thirteenth and fourteenth lens is positive, positive, negative, positive and positive.

20. The panoramic lens assembly as claimed in claim 16, wherein the second lens assembly further comprises a stop disposed between the tenth lens and the eleventh lens.

* * * * *